Oct. 12, 1948.   R. M. KINGMAN   2,451,032
INSTRUMENT DRIVE
Filed March 26, 1946
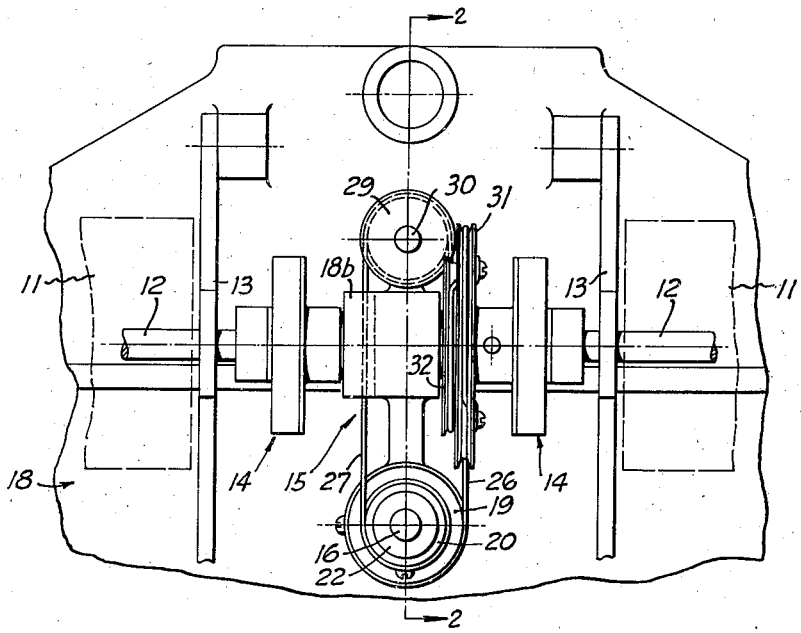
FIG_1_
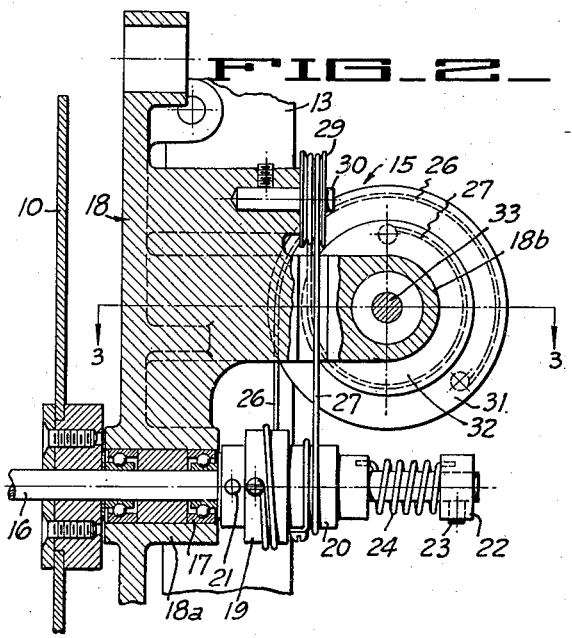
FIG_2_
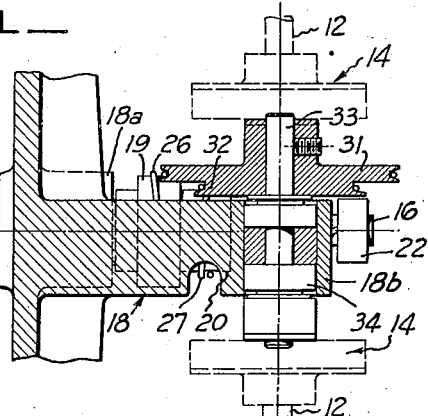
FIG_3_
INVENTOR.
Rufus M. Kingman
BY
ATTORNEY Patented Oct. 12, 1948

2,451,032

UNITED STATES PATENT OFFICE 2,451,032

INSTRUMENT DRIVE

Rufus M. Kingman, Palo Alto, Calif., assignor, by mesne assignments, to Hewlett-Packard Company, Palo Alto, Calif., a corporation of California Application March 26, 1946, Serial No. 657,243

3 Claims. (Cl. 74—501)

1

This invention relates generally to drive mechanisms and is concerned more particularly with motion transmitting pulley and cable drives of the type suitable for use with various instruments.

In many types of instruments drive transmitting trains are utilized for the adjustment or angular setting of parts where extreme accuracy is desired, and in such instances it is desirable to eliminate lost motion in the drive transmitting train. One example of such control drives is found in variable condensers of the type employed in electronic signaling or testing equipment. In this type of application accuracy of drive transmission is an important factor and all lost motion or backlash in the drive transmission train should be eliminated. At the same time that the lost motion is eliminated, it is desirable that this be effected in a manner which will not apply a net torque to the drive in either direction of adjustment whereby the control drive is equally responsive and equally accurate in either direction of operation.

It is an object of the present invention to provide a pulley and cable drive which eliminates lost motion without applying net torque to the drive.

A further object of the invention is to provide a pulley and cable drive connection of the above character of a simple construction which will be applicable to various instrument-controlled drives in a convenient manner.

Other objects of the invention will be apparent from the following description of a preferred embodiment of the invention as illustrated in the accompanying drawings, in which:

Figure 1 is an elevational view of a pulley and cable drive train as installed in a variable condenser unit;

Figure 2 is a transverse sectional view taken in a plane indicated by the line 2—2 in Figure 1; and Figure 3 is a fragmentary horizontal sectional view taken as indicated by the line 3—3 in Figure 2.

Referring to the drawings, there is illustrated an embodiment of the improved pulley and cable drive system as mounted in electronic signaling or testing equipment of the type employing variable condensers. The equipment includes a pair of variable condensers 11 which are illustrated schematically and which are connected for operation by respective drive shafts 12. The shafts are shown extending through the supporting brackets 13 and are connected through suitable universal drive couplings 14 to the pulley and cable drive

2 transmitting unit 15. The unit 15 is driven from a control or adjusting shaft 16 which extends through the front panel 10 and which may have a suitable control knob (not shown) attached thereto. The universal drive couplings 14 should be constructed in such a manner as to eliminate lost motion and may be of the type shown in my co-pending application Serial Number 669,266, filed May 13, 1946.

The adjusting or control shaft 16 as seen in Figure 2 is suitably journaled as by means of ball bearings 17 in an apertured boss 18a of a drive supporting bracket 18. The shaft 16 has thereon a pair of pulleys 19 and 20, the pulley 19 being suitably secured to the shaft as by means of a pin 21, and the pulley 20 being loosely mounted on the shaft. At its inner end, the shaft 16 carries a collar 22 which is secured to the shaft by means of a setscrew 23 and has one end of a torsion spring 24 fastened therein. The other end of the torsion spring 24 is secured to the pulley 20 so that a twisting bias or torque is applied between the pulley 20 and the shaft 16, and consequently, between the pulley 20 and the pulley 19. As will appear later, the torsion spring 24 provides a tension element or means for eliminating lost motion in the drive mechanism.

Respective cables or like flexible drive elements 26 and 27 are wound about the pulleys 19 and 20, respectively, in opposite directions and are dead-ended thereto. The cable 27 extends upwardly from the pulley 20 to an idler direction reversing sheave 29 journaled on a shaft 30 secured in the bracket 18. The respective cables 26 and 27 are connected to respective grooved pulleys 31 and 32 which are attached together or formed integrally as shown in Figure 3. These sheaves are carried by a drive shaft 33, which is journaled by bearings 34 in a boss 18b of the bracket 18. The cables 26 and 27 are wound oppositely on the respective pulleys 31 and 32 and are dead-ended thereto. The shaft 33 is connected to and drives the respective universal drive couplings 14 so that a drive is transmitted through the pulley and cable system from the adjusting and control shaft 16 to both of the drive shafts 12 for the variable condensers 11. Cable 27 is shown with an extra wrap about sheave 29 in order that cables 26 and 27 may be of comparable length.

The diameters of the pulleys 31 and 32 bear the same ratio to each other as the ratio between the diameters of the pulleys 19 and 20 associated therewith. As a result, no net torque is applied to the drive by virtue of the tension applied by the tensioning element 24 in maintaining the cable systems taut and ready to transmit accurate drive in either direction of adjustment of the adjusting or control drive shaft 16. For either direction of drive, torque from control shaft 16 is applied through one of the cables. Thus my drive is a distinct improvement over spring tensioned cord or cable drives which have been used in the past where turning torque in one direction is applied through the tensioning spring and therefore is accompanied by inaccuracy in the positioning of the instrument shaft.

While I have shown a preferred embodiment of the invention, it will be apparent that the invention is capable of other embodiments and the scope thereof should be limited only by the scope of the claims appended hereto.

I claim:

1. In an instrument drive, a drive shaft, a driven shaft, one of said shafts having a pair of pulleys mounted thereon, one of said pulleys being fixed to said one shaft and the other of said pulleys being free on said one shaft, a torque applying spring interconnecting said free pulley and said shaft, cables connected to said respective pulleys and wound in opposite directions thereon, and a second pair of pulleys on said driven shaft and receiving said respective cables.

2. In an instrument drive, a drive shaft, a driven shaft, one of said shafts having a pair of pulleys mounted thereon, one of said pulleys being fixed to said one shaft and the other of said pulleys being free on said one shaft, torque applying tension means interconnecting said shaft and said free pulleys, cables connected to said respective pulleys and wound in opposite directions thereon, and a second pair of pulleys for transmitting a drive to said driven shaft and receiving said respective cables.

3. In an instrument drive, a drive shaft, a driven shaft, one of said shafts having a pair of pulleys mounted thereon, one of said pulleys being fixed to said one shaft and the other of said pulleys being free thereon, tension means interconnecting said free pulley and said shaft, cables connected to said respective pulleys and wound in opposite directions thereon, and a second pair of pulleys on said driven shaft and receiving said respective cables, the diameters of said pulleys on said one shaft having the same ratio as the ratio of the diameters of the pulleys on the other of said shafts whereby said tension means eliminates play in the pulley and cable drive without applying a net torque thereto.

RUFUS M. KINGMAN.

REFERENCES CITED

The following references are of record in the file of this patent:

UNITED STATES PATENTS

| Number | Name | Date |
| --- | --- | --- |
| 1,935,806 | Mautsch | Nov. 21, 1933 |
| 1,946,296 | Stephenson | Feb. 6, 1934 |
| 1,980,172 | Ball | Nov. 31, 1934 |
| 2,178,066 | Clark | Oct. 31, 1939 |
| 2,405,377 | Sturgess et al. | Aug. 6, 1946 |